United States Patent
Bauers et al.

(10) Patent No.: US 9,919,506 B2
(45) Date of Patent: Mar. 20, 2018

(54) FLOOR COVERING ADHESIVE COMPOSITION COMPRISING A VINYL ACETATE-ETHYLENE COPOLYMER

(71) Applicant: Wacker Chemie AG, München (DE)

(72) Inventors: Florian Bauers, Burghausen (DE); Stephan Kaiser, Simbach (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 15/035,875

(22) PCT Filed: Oct. 28, 2014

(86) PCT No.: PCT/EP2014/073140
§ 371 (c)(1),
(2) Date: May 11, 2016

(87) PCT Pub. No.: WO2015/071095
PCT Pub. Date: May 21, 2015

(65) Prior Publication Data
US 2016/0289512 A1    Oct. 6, 2016

(30) Foreign Application Priority Data
Nov. 14, 2013 (DE) .......................... 10 2013 223 196

(51) Int. Cl.
| | | |
|---|---|---|
| B32B 37/00 | (2006.01) | |
| B32B 37/12 | (2006.01) | |
| C08F 218/08 | (2006.01) | |
| B32B 37/14 | (2006.01) | |
| C09J 131/04 | (2006.01) | |
| C08K 3/26 | (2006.01) | |

(52) U.S. Cl.
CPC .............. B32B 37/12 (2013.01); B32B 37/14 (2013.01); C08F 218/08 (2013.01); C09J 131/04 (2013.01); B32B 2471/02 (2013.01); C08F 2800/20 (2013.01); C08K 2003/265 (2013.01); C09J 2203/314 (2013.01)

(58) Field of Classification Search
CPC .. C09J 131/04; C09J 2203/314; C08F 218/08; B32B 2471/00; B32B 2471/02; B32B 37/12
See application file for complete search history.

(56) References Cited

U.S. PATENT DOCUMENTS

| | | | |
|---|---|---|---|
| 4,128,518 A | 12/1978 | Oyamada et al. | |
| 4,239,563 A | 12/1980 | Iacoviello | |
| 4,322,516 A * | 3/1982 | Wiest | C08F 218/08 428/355 AC |
| 4,997,879 A | 3/1991 | Weissgerber et al. | |
| 5,371,137 A * | 12/1994 | Blincow | C08F 210/00 524/563 |
| 5,665,816 A | 9/1997 | Gerharz et al. | |
| 6,169,132 B1 * | 1/2001 | Fickeisen | C09J 193/00 524/270 |
| 6,746,555 B1 | 6/2004 | Kuenstle et al. | |
| 2005/0113499 A1* | 5/2005 | Tamcke | C09J 133/08 524/270 |
| 2012/0325947 A1* | 12/2012 | Levy | B03B 9/061 241/81 |

FOREIGN PATENT DOCUMENTS

| | | |
|---|---|---|
| CN | 1951996 A | 4/2007 |
| EP | 0216210 A1 | 4/1987 |
| EP | 0321868 A2 | 6/1989 |
| EP | 0530013 A1 | 3/1993 |
| EP | 0699691 A1 | 3/1996 |
| EP | 0699692 A2 | 3/1996 |
| EP | 1069169 A1 | 1/2001 |
| EP | 1777241 A1 | 4/2007 |
| GB | 1408894 A | 10/1975 |

OTHER PUBLICATIONS

Fox T. G., Bull. Am. Physics Soc. 1, 3, p. 123 (1956).
Polymer Handbookk 2nd Edition, J. Wiley & Sons, New York (1975).
International Search Report of WO2015/071095 A1, dated Jan. 22, 2015.

* cited by examiner

Primary Examiner — John Goff
(74) Attorney, Agent, or Firm — RatnerPrestia

(57) ABSTRACT

The invention relates to a floor covering adhesive composition, based on an aqueous, emulsifier-stabilized polymer dispersion of vinyl acetate-ethylene copolymer, containing A) tackifying resin, B) one or more fillers, and C) a vinyl acetate-ethylene copolymer in the form of an emulsifier-stabilized aqueous dispersion, characterized in that the vinyl acetate-ethylene copolymer is obtained by radical-initiated emulsion polymerization in an aqueous medium, of a) 60 to 89.9% by weight of vinyl acetate, b) 10 to 36% by weight of ethylene, c) 0 to 2% by weight of one or more monomers selected from the group of vinyl esters of carboxylic acids having 8 to 12 C atoms and acrylic acid alkyl esters having a $C_1$ to $C_8$ alkyl radical, d) 0.1 to 5% by weight of one or more ethylenically unsaturated auxiliary monomers having a carboxylic acid group, amide group, nitrile group or sulfonic acid (salt) group, wherein the percentages stated in % by weight are each in relation to the total weight of the comonomers and add up to 100% by weight, and the polymerization is carried out in the presence of one or more emulsifiers.

8 Claims, No Drawings

FLOOR COVERING ADHESIVE COMPOSITION COMPRISING A VINYL ACETATE-ETHYLENE COPOLYMER

CROSS-REFERENCE TO RELATED APPLICATIONS

This application is the U.S. National stage filing of International Application No. PCT/EP2014/073140, filed 28 Oct. 2014, and claims priority of German application number 10 2013 223 196.2, filed 14 Nov. 2013, the entireties of which applications are incorporated herein by reference.

FIELD OF THE INVENTION

The invention relates to a floor covering adhesive composition, on the basis of an aqueous, emulsifier-stabilized polymer dispersion of vinyl acetate-ethylene copolymer, comprising A) tackifying resin, B) one or more fillers, and C) a vinyl acetate-ethylene copolymer in the form of an emulsifier-stabilized aqueous dispersion.

BACKGROUND OF THE INVENTION

Flooring adhesives are employed for adhesively bonding carpets, plastic floor coverings, made from PVC or polyolefin, for example, and for adhesively bonding coverings made from natural substances such as cork or wood. Floor covering adhesives used are predominantly dispersions based on acrylate polymers. These dispersions are especially suitable for application as floor covering adhesives because the low glass transition temperature of the acrylate polymers, customarily based on butyl acrylate and/or 2-ethylhexyl acrylate, give the polymer films a high surface tack. On an alkaline substrate at a pH>9.0, however, acrylate-containing dispersions release the corresponding volatile alcohols through hydrolysis of the ester group. Thus butyl acrylate releases butanol and 2-ethylhexyl acrylate releases 2-ethylhexanol, which may be emitted to the ambient air. Accordingly, flooring adhesives based on vinyl acetate-ethylene copolymers have been developed.

EP 0 699 692 A2 discloses polymers of vinyl acetate, ethylene, and (meth)acrylic ester which are grafted with cellulose ether and which are recommended as flooring adhesives. A disadvantage here is that these copolymers still always have a high fraction of OH-acrylic ester monomer units and/or (meth)acrylic ester monomer units and are therefore unsatisfactory in terms of VOC emissions.

Copolymers of this kind with a high fraction of OH-acrylic ester monomer units, in use as heat-resistance pressure-sensitive adhesives, are also described in EP 0 216 210 A1.

From EP 0 699 691 A1 it is known that the adhesive qualities of aqueous dispersions of vinyl acetate-ethylene copolymers can be improved by modifying the dispersion with fully hydrolyzed polyvinyl alcohol, in other words with a polyvinyl alcohol having a degree of hydrolysis of more than 90 mol %. A problem here is the compatibility of vinyl acetate-ethylene copolymer dispersions comprising partially hydrolyzed polyvinyl alcohol with such highly hydrolyzed polyvinyl alcohols. To improve the compatibility it is proposed that a mixture be used of partially hydrolyzed polyvinyl alcohols in order to stabilize the vinyl acetate-ethylene copolymer dispersion.

EP 1 069 169 A1 proposes improving the tradeoff between VOC emissions and adhesive properties by copolymerizing, rather than (meth)acrylic ester comonomers, vinyl esters of alpha-branched carboxylic acids (vinyl esters of Versatic acid, such as VeoVa9 or VeoVa10 from Momentive). Even vinyl esters of this kind, however, are subject to the hydrolysis, and Versatic acid that is released, in analogy to hydroxycarboxylic acids released by hydrolysis, leads to unpleasant odor in application as bonding agents.

EP 0 530 013 A1 describes bonding agents based on vinyl acetate-ethylene copolymers, the copolymer recommended for flooring adhesives being obtained by copolymerization of 5 to 85 wt % of vinyl acetate, 10 to 50% of ethylene, and 5 to 85 wt % of a high vinyl esters such as vinyl 2-ethylhexanoate. Disadvantages are the high costs due to the high fractions of higher vinyl esters, and the prolonged polymerization time on copolymerization of large amounts of higher vinyl esters.

SUMMARY OF THE INVENTION

It was an object of the invention, therefore, to provide a floor covering adhesive based on an aqueous dispersion of vinyl acetate-ethylene copolymers with which these emission problems do not occur, but which does not fall down in terms of adhesive properties relative to acrylate-based flooring adhesives.

DETAILED DESCRIPTION OF THE INVENTION

A subject of the invention is a floor covering adhesive composition, on the basis of an aqueous, emulsifier-stabilized polymer dispersion of vinyl acetate-ethylene copolymer, comprising
  A) tackifying resin,
  B) one or more fillers, and
  C) a vinyl acetate-ethylene copolymer in the form of an emulsifier-stabilized aqueous dispersion,
  characterized in that the vinyl acetate-ethylene copolymer is obtained by radically initiated emulsion polymerization, in aqueous medium, of
  a) 60 to 89.9 wt % of vinyl acetate,
  b) 10 to 36 wt % of ethylene,
  c) 0 to 2 wt % of one or more monomers from the group of the vinyl esters of carboxylic acids having 8 to 12 C atoms and the acrylic acid alkyl esters with $C_1$ to $C_8$ alkyl radical,
  d) 0.1 to 5 wt % of one or more ethylenically unsaturated auxiliary monomers with carboxylic acid group, amide group, nitrile group or sulfonic acid (salt) group,
  the figures in wt % being based in each case on the total weight of the comonomers and adding up to 100 wt %, and the polymerization being performed in the presence of one or more emulsifiers.

Suitable tackifying resins A) are, for example, rosins, more particularly balsam resins, tall resins, tung resins, or hydrocarbon resins such as terpene resins, coumarone-indene resins. These resins may optionally also have been modified, by means for example of esterification with polyhydric alcohols such as ethylene glycol, glycerol or pentaerythritol. The floor covering adhesive composition preferably comprises 5 to 35 wt % of tackifying resin A), based on the total weight of the floor covering adhesive composition.

Suitable fillers B) are, for example, ground or precipitated calcium carbonate (chalks) or finely ground quartz, or kaolin. The filler fraction is preferably 15 to 50 wt %, based on the total weight of the floor covering adhesive composition.

The aqueous dispersion C) of the vinyl acetate-ethylene copolymer is used preferably in an amount of 15 to 50 wt %, based on the total weight of the floor covering adhesive composition.

The aqueous dispersion C) is prepared by copolymerizing preferably 66 to 86 wt % of vinyl acetate a), based on the total weight of the comonomers.

Preferably 10 to 30 wt % of ethylene b) are copolymerized, based on the total weight of the comonomers.

Suitable monomers c) are, for example, vinyl laurate, vinyl 2-ethylhexanoate, methyl acrylate, ethyl acrylate, propyl acrylate, n-butyl acrylate, 2-ethylhexyl acrylate. Preference is given to vinyl laurate and n-butyl acrylate. The monomers c) are preferably copolymerized in an amount of 0.1 to 2 wt %, more preferably in an amount of 0.1 to 1 wt %, based in each case on the total weight of the comonomers.

Suitable auxiliary monomers d) are, for example, ethylenically unsaturated monocarboxylic and dicarboxylic acids such as acrylic acid, methacrylic acid, itaconic acid, maleic acid, and maleic anhydride. Further examples of auxiliary monomers are ethylenically unsaturated carboxamides and carbonitriles such as acrylamide and acrylonitrile.

Suitable auxiliary monomers are also ethylenically unsaturated sulfonic acids or their salts such as vinylsulfonic acid (salt) or 2-acrylamido-2-methylpropanesulfonic acid (salt). The auxiliary monomers d) are copolymerized in an amount of 0.1 to 5 wt %, preferably in an amount of 0.1 to 4 wt %, based in each case on the total weight of the comonomers.

The figures in weight percent for the comonomers a), b), d) and optionally c) add up in the copolymers in each case to 100 wt %. In general the monomer selection and the selection of the weight fractions of the comonomers are made so as to result in a glass transition temperature, Tg, of preferably −20° C. to 0° C. The glass transition temperature Tg of the polymers can be determined in a known way as midpoint temperature by means of Differential Scanning calorimetry (DSC) in accordance with ASTM D3418-82. The Tg can also be calculated in advance, approximately, using the Fox equation. According to Fox T. G., Bull. Am. Physics Soc. 1, 3, page 123 (1956): $1/Tg=x_1/Tg_1+x_2/Tg_2+ \ldots +x_n/Tg_n$, where $x_n$ is the mass fraction (wt %/100) of the monomer n, and $Tg_n$ is the glass transition temperature, in kelvins, of the homopolymer of the monomer n. Tg values for homopolymers are listed in Polymer Handbook 2nd Edition, J. Wiley & Sons, New York (1975).

Particularly preferred copolymers are obtained by copolymerization of a) 66 to 86 wt % of vinyl acetate, b) 10 to 30 wt % of ethylene, c) 0.1 to 2 wt % of vinyl laurate and/or n-butyl acrylate, and also 0.1 to 4 wt % of one or more auxiliary monomers d) from the group of the ethylenically unsaturated monocarboxylic and dicarboxylic acids, the ethylenically unsaturated carboxamides and the ethylenically unsaturated sulfonic acids or salts thereof, more particularly acrylic acid, acrylamide, vinylsulfonic acid (salt), the figures in wt % adding up in each case to 100 wt %.

Preparation by the emulsion polymerization process takes place at 30° C. to 120° C., preferably 45° C. to 70° C., and under a pressure of 30 to 100 bar abs., preferably 40 to 80 bar abs. The polymerization can be carried out in a batch process, where all of the components are included in the initial charge to the reactor, and in the metering process, where individual or a plurality of components are supplied during the polymerization. The metered feeds may be carried out separately (in terms of location and of time), or some or all of the components for metering may be metered in preemulsified form.

The polymerization is initiated preferably with the redox initiator combinations that are customary for emulsion polymerization. Examples of suitable oxidation initiators are the sodium, potassium, and ammonium salts of peroxodisulfuric acid, hydrogen peroxide, tert-butyl hydroperoxide, cumene hydroperoxide, isopropylbenzene monohydroperoxide. Preferred are the sodium, potassium, and ammonium salts of peroxodisulfuric acid, and hydrogen peroxide. The stated initiators are used in general in an amount from 0.015 to 3.0 wt %, based on the total weight of the monomers.

Suitable reducing agents are the sulfites and bisulfites of the alkali metals and of ammonium, as for example sodium sulfite, the derivatives of sulfoxylic acid such as zinc or alkali metal formaldehyde-sulfoxylates, as for example sodium hydroxymethanesulfinate (Brüggolit), and (iso) ascorbic acid (salts). Preferred are ascorbic acid, sodium isoascorbate, sodium sulfate and the sulfinic acid derivative known under the trade name Brueggolit® FF6. The amount of reducing agent is preferably 0.01 to 2 wt %, based on the total weight of the monomers.

The stated oxidizing agents, more particularly the salts of peroxodisulfuric acid, may also be used alone as thermal initiators.

The polymerization batch is stabilized in the presence of one or more emulsifiers. Emulsifiers used are preferably nonionic emulsifiers or anionic emulsifiers or mixers of nonionic and anionic emulsifiers.

Suitable nonionic emulsifiers are, for example, acyl, alkyl, oleyl, and alkylaryl ethoxylates. These products are available commercially under the Genapol® or Lutensol® name, for example. They include ethoxylated mono-, di-, and tri-alkylphenols, preferably having a degree of ethoxylation of 3 to 50 ethylene oxide units and $C_4$ to $C_{12}$ alkyl radicals, and ethoxylated fatty alcohols, preferably having a degree of ethoxylation of to 80 ethylene oxide units and $C_8$ to $C_{36}$ alkyl radicals. Suitable nonionic emulsifiers are also $C_{13}$-$C_{15}$ oxo-process alcohol ethoxylates having a degree of ethoxylation of 3 to 30 ethylene oxide units, $C_{16}$-$C_{18}$ fatty alcohol ethoxylates having a degree of ethoxylation of 11 to 80 ethylene oxide units, $C_{10}$ oxo-process alcohol ethoxylates having a degree of ethoxylation of 3 to 11 ethylene oxide units, $C_{13}$ oxo-process alcohol ethoxylates having a degree of ethoxylation of 3 to 20 ethylene oxide units, polyoxyethylenesorbitan monooleate having 20 ethylene oxide groups, copolymers of ethylene oxide and propylene oxide having a minimum ethylene oxide content of 10 wt %, polyethylene oxide ethers of oleyl alcohol having a degree of ethoxylation of 4 to 20 ethylene oxide units, and the polyethylene oxide ethers of nonylphenol having a degree of Ethoxylation of 4 to 20 ethylene oxide units.

Preferred are ethoxylated fatty alcohols, preferably having a degree of ethoxylation of 3 to 80 ethylene oxide units and $C_8$ to $C_{36}$ alkyl radicals; $C_{13}$-$C_{15}$ oxo-process alcohol ethoxylates having a degree of ethoxylation of 3 to 30 ethylene oxide units; $C_{16}$-$C_{18}$ fatty alcohol ethoxylates having a degree of ethoxylation of 11 to 80 ethylene oxide units.

Examples of suitable anionic emulsifiers are sodium, potassium, and ammonium salts of straight-chain aliphatic carboxylic acids having 12 to 20 C atoms; sodium hydroxyoctadecanesulfonate; sodium, potassium, and ammonium salts of hydroxy fatty acids having 12 to 20 C atoms and their sulfonation and/or acetylation products; sodium, potassium, and ammonium salts of alkyl sulfates, also in the form of triethanolamine salts, and sodium, potassium, and ammonium salts of alkylsulfonates having in each case 10 to 20 C atoms and of alkylarylsulfonates having 12 to 20 C atoms; dimethyldialkylammonium chloride having 8 to 18 C atoms and the sulfonation products thereof; sodium, potassium, and ammonium salts of sulfosuccinic esters with aliphatic saturated monohydric alcohols having 4 to 16 C atoms, and of sulfosuccinic 4-esters with polyethylene glycol ethers of monohydric aliphatic alcohols having 10 to 12 C atoms, especially the disodium salts thereof, and of sulfosuccinic 4-esters with polyethylene glycol nonylphenyl ether, especially the disodium salt thereof, and of sulfosuccinic acid biscyclohexyl ester, especially the sodium salt thereof; lignosulfonic acid and also the calcium, magnesium, sodium, and ammonium salts thereof; resin acids and also hydrogenated and dehydrogenated resin acids, and also the alkali metal salts thereof.

Preferred are the sodium, potassium, and ammonium salts of sulfosuccinic esters with aliphatic, saturated, monohydric alcohols having 4 to 16 C atoms.

The amount of emulsifier is preferably 3 to 10 wt %, based on the total weight of the monomers. Mixtures of nonionic and anionic emulsifiers in the stated amount may also be used.

Optionally it is possible for small amounts of up to 1 wt % of protective colloids to be used, based on the total weight of the monomers. Suitable protective colloids are polyvinyl alcohols; polyvinyl acetals; polyvinyl pyrrolidones; polysaccharides in water-soluble form such as starches (amylase and amylopectin), celluloses and their carboxymethyl, methyl, hydroxyethyl, hydroxypropyl derivatives; proteins such as casein or caseinate, soy protein, gelatin; lignosulfonates; synthetic polymers such as poly(meth)acrylic acid, copolymers of (meth)acrylates with carboxyl-functional comonomer units, poly(meth)acrylamide, polyvinylsulfonic acids and their water-soluble copolymers; styrene-maleic acid and vinyl ether-maleic acid copolymers. Examples of polyvinyl alcohols are partially hydrolyzed polyvinyl alcohols having a degree of hydrolysis of 80 to 95 mol % and a Höppler viscosity, in 4% strength aqueous solution, of 1 to 30 mPas (Höppler method at 20° C., DIN 53015). The polymerization is preferably carried out without the addition of protective colloid.

The aqueous dispersions C) have a solids content of 30 to 75 wt %, preferably of 40 to 65 wt %.

The floor covering adhesive composition is produced by blending components A), B), and C) in the mixing assemblies customary for such purposes. Optionally it is possible as well to add further additives such as processing aids, emulsifiers, thickening assistants, or water.

The floor covering adhesion composition is suitable for adhesively bonding woodblock flooring, laminate, plastic floor coverings, carpets, floor coverings made from natural materials such as cork, sisal, linoleum, on substrates such as concrete, screed, wood fiberboard.

An advantageous aspect of the floor covering adhesive composition according to the invention is that zero or extremely small amounts of alcohols such as butanol can be released by hydrolysis from the dispersion on alkaline substrates, and at the same time the performance properties, especially wet bonding time and tensile shear strength, of acrylate-based polymer dispersions are attained.

In contrast, floor covering adhesive compositions with vinyl acetate-ethylene copolymers of comparable Tg exhibit poorer workability, low storage time, and a substantially poorer quality of the adhesive bond.

The examples which follow serve for further elucidation of the invention:

Testing took place using a floor covering adhesive composition having the following composition:

| | |
|---|---|
| Bonding agent dispersion | 32.0 wt % |
| Rosin mixture | 20.0 wt % |
| Filler (Omyacarb 6, Omya GmbH) | 10.0 wt % |
| Filler (Omyacarb 20, Omya GmbH) | 26.0 wt % |
| Emulsifier (Witcolate B 320) | 0.5 wt % |
| Thickener (Latecoll D, 4% strength) | 8.5 wt % |
| Water | 3.0 wt % |

INVENTIVE EXAMPLE 1

Floor covering adhesive composition with bonding agent dispersion A:

Aqueous copolymer dispersion obtained by emulsion polymerization of 66.5 wt % vinyl acetate, 29.4 wt % ethylene, 0.7 wt % n-butyl acrylate, 2.0 wt % acrylic acid, and 1.4 wt % acrylamide in the presence of 2.4 wt % of an emulsifier mixture comprising an ethoxylated sulfosuccinate monoester and an ethoxylated isotridecyl alcohol. The dispersion had a solids content of 57.0%. The copolymer had a Tg of −10° C.

COMPARATIVE EXAMPLE 1

Floor covering adhesive composition with bonding agent dispersion B:

Aqueous copolymer dispersion obtained by emulsion polymerization of 75.0 wt % vinyl acetate and 25.0 wt % ethylene in the presence of 2.4 wt % of an emulsifier mixture comprising an ethoxylated sulfosuccinate monoester and an ethoxylated isotridecyl alcohol. The dispersion had a solids content of 57%. The copolymer had a Tg of −10° C.

COMPARATIVE EXAMPLE 2

Floor covering adhesive composition with bonding agent dispersion C:

Aqueous copolymer dispersion obtained by emulsion polymerization of 34.6 wt % vinyl acetate, 18.5 wt % ethylene, 44.7 wt % 2-ethylhexyl acrylate, 1.2 wt % acrylic acid, and 1 wt % acrylamide in the presence of 2.4 wt % of an emulsifier mixture comprising an ethoxylated sulfosuccinate monoester and an ethoxylated isotridecyl alcohol. The dispersion had a solids content of 57.0%. The copolymer had a Tg of −38° C.

Measuring and Testing Methods:

The bonding agent properties were ascertained with the following methods of determination:

Determination of spreadability of the floor covering adhesive (viscosity factor VF):

The floor covering adhesive composition was stored in each case for one day in a conditioned area at 23° C. and 50% relative humidity. The viscosity was then measured with a Brookfield viscometer (RVDV II+), by means of the spindle for use with the corresponding measuring range, at 23° C. and both at one revolution per minute (rpm) and 100 revolutions per minute.

The ratio of the Brookfield viscosity at 1 rpm and 100 rpm is termed the viscosity factor VF and is a measure of the spreadability of the floor covering adhesive.

Storage integrity of the floor covering adhesive (storage integrity SI):

The floor covering adhesive composition was introduced in each case into a 250 ml glass bottle, the fill level of the glass bottle being approximately 90 vol %. After being sealed, the glass bottle was stored in a heat cabinet at 50° C. The consistency of the adhesive was assessed after storage for 1, 2, 3, and 4 weeks, respectively.

Determination of wet bonding time of the floor covering adhesive (wet bonding time WBT):

The floor covering adhesive composition was applied in each case to a beach plywood panel (200×400 mm) in lengthwise direction using a Pajarito notched applicator (TKB B2 notching). After 20 minutes, test strips of a PVC floor covering measuring 50×200 mm were laid transverse to the applied adhesive, and were rolled on five times (back and forward) using a roller weight weighing 3.5 kg. Immediately thereafter, peeling took place as evenly as possible (about 50 mm/min) with a spring balance.

The laying process was repeated in an unused bed of adhesive in a 10-minute cycle.

The definite wet bonding time is the time after which only 70% of the PVC test strip is wetted (cohesive fracture on removal).

Determination of tensile shear strength of the floor covering adhesive (tensile shear strength TSS):

First of all, test specimens of mosaic wood block tiles (oak, 140 mm×23 mm×8 mm) were produced in a conditioned area at 23° C. and 50% relative humidity. For this purpose, sets of six mosaic wood block tiles were placed next to one another and in lengthwise direction a bonding area of 26.1×23 mm was taped off with an adhesive tape. The floor covering adhesive composition was applied in each case with a Pajarito notched applicator (TKB B2 notching), and then the adhesive tape was removed.

After 10 minutes, a second mosaic wood block tile was laid onto the area for bonding. The test specimens were then weighted with a weight of 2 kg for each six test specimens for one hour.

The test specimens were subsequently stored as follows: Three test specimens were stored for 3 days at 23° C. and 50% relative humidity (standard conditions) (standard conditions storage SCS).

Three test specimens were stored for one day at 23° C. and 50% relative humidity, then for three days at 50° C. in a heat cabinet, and lastly for one day at 23° C. and 50% relative humidity (hot storage HS).

The tensile shear strengths were determined in accordance with EN 14293:2006 using a tensile testing machine (from Zwick, Ulm).

The results of measurement are summarized in Table 1.

TABLE 1

Properties of the flooring adhesives

| Example | VF | SI 50° C. | WBT | TSS (SC) | TSS (HS) |
|---|---|---|---|---|---|
| Inv. 1 | 40 | 4 weeks | 40 min | 1.3 N/mm² | 1.6 N/mm² |
| Comp. 1 | 11 | 1 week | 10 min | 0.2 N/mm² | 0.5 N/mm² |
| Comp. 2 | 28 | 4 weeks | 50 min | 1.2 N/mm² | 1.6 N/mm² |

Discussion of the results from Table 1:

The floor covering adhesive composition of the invention (inventive example 1) scored well for spreadability (VF>30), exhibited long storage integrity (SI), and scored highly for tensile shear strength (TSS). The floor covering adhesive composition from inventive example 1 exhibited comparable tensile shear strengths with substantially improved spreadability (workability) by comparison with the bonding agent having a high acrylate monomer content (comparative example 2).

The floor covering adhesive composition from comparative example 1 exhibited very poor spreadability (VF), inadequate storage stability (SI), and much poorer tensile shear strengths (TSS) than the floor covering adhesive composition of the invention from inventive example 1.

Assessment of the odor of dispersion films:

The polymer dispersions were diluted with water to produce approximately 30% aqueous dispersions, and were adjusted to a pH of 9.5 with addition of 10% strength aqueous sodium hydroxide solution. Films were produced by pouring the dispersions thus treated onto a silicone rubber plate and then drying them for 48 hours at 23° C. and 50% relative humidity. The resulting films in 15 cm×10 cm format were introduced into a 250 ml wide-neck glass bottle, preheated to 75° C. and equipped with a screw closure, and were placed for five minutes in a drying cabinet heated to 75° C. After cooling to room temperature, the odor intensity was assessed by three testers on the basis of a rating scale from 1 (very good) to 6 (very poor).

Assessments were made of the dispersion from inventive example 1, from comparative example 2, and a comparative dispersion D produced by the method from example 1 of EP 1069169.

The results of odor testing are reproduced in Table 2:

TABLE 2

| Dispersion | A (Inventive example 1) | C (Comparative example 2) | D (Example 1 from EP 1069169) |
|---|---|---|---|
| Tester 1 | 2 | 5 | 3 |
| Tester 2 | 2 | 5 | 4 |
| Tester 3 | 2 | 4 | 4 |

In the odor testing on dispersion films, the dispersion from inventive example 1 receives a better assessment than the dispersion from comparative example 2 and than the comparative dispersion D of EP 1 069 169 A1. With dispersion C in particular there was a pungent odor.

The invention claimed is:

1. A process for adhesively bonding a floor covering to a flooring substrate, wherein the floor covering is made from a natural material selected from the group consisting of cork, sisal, and linoleum and the flooring substrate is selected from the group consisting of concrete, screed, and wood fiberboard, said process comprising
   1) applying to the flooring substrate a floor, covering adhesive composition, and
   2) while the floor covering adhesive composition is still wet, applying the floor covering thereto,
   wherein the floor covering adhesive composition comprises
   A) a tackifying resin, B) one or more fillers and C) a vinyl acetate-ethylene copolymer in the form of an emulsifier-stabilized aqueous dispersion,
   wherein the vinyl acetate-ethylene copolymer is obtained by radically initiated emulsion polymerization, in an aqueous medium, of the following monomers and no others
   a) 60 to 89.9 wt % of vinyl acetate,
   b) 10 to 36 wt % of ethylene, c) 0.1 to 2 wt % of one or more monomers selected from the group consisting of acrylic acid alkyl esters with $C_1$ to $C_8$ alkyl radicals, d) optionally one or more vinyl esters of carboxylic acids having 8 to 12 C atoms, provided that the vinyl esters and the acrylic acid alkyl esters total to 0.1 to 2 wt %, and e) 0.1 to 5 wt % of one or more ethylenically unsaturated auxiliary monomers bearing a carboxylic acid group, amide group, nitrile group or sulfonic acid (salt) group, the figures in wt % being based in each case on the total weight of the comonomers and adding up to 100 wt %, and the polymerization being performed in the presence of one or more emulsifiers.

2. The process as claimed in claim 1, wherein 5 to 35 wt % of tackifying resin A) is included.

3. The process as claimed in claim 1, wherein 15 to 50 wt % of fillers B) is included.

4. The process as claimed in claim 1, wherein 15 to 50 wt % of dispersion C) is included.

5. The process as claimed in claim 1, wherein 66 to 86 wt % of vinyl acetate a), based on the total weight of the comonomers, is copolymerized.

6. The process as claimed in claim 1, wherein 10 to 30 wt % of ethylene b), based on the total weight of the comonomers, is copolymerized.

7. The process as claimed in claim 1, wherein 0.1 to 4 wt % of auxiliary monomers e), based on the total weight of the comonomers, is copolymerized.

8. The process as claimed in claim 1, wherein the aqueous dispersion is stabilized with one or more nonionic or anionic emulsifiers or mixtures of nonionic and anionic emulsifiers.

* * * * *